United States Patent
Wu et al.

(10) Patent No.: US 7,728,929 B2
(45) Date of Patent: Jun. 1, 2010

(54) TRANSFLECTIVE LIQUID CRYSTAL DISPLAY DEVICE

(75) Inventors: Yi-Chun Wu, Hua Lien (TW); Wen-Jui Liao, Tan Tsu Hsiang (TW); Chin-Chang Liu, Feng Yuan (TW); Chian-Chang Lee, Tai Chung (TW)

(73) Assignee: Wintek Corporation, Taichung (TW)

( * ) Notice: Subject to any disclaimer, the term of this patent is extended or adjusted under 35 U.S.C. 154(b) by 747 days.

(21) Appl. No.: 11/543,837

(22) Filed: Oct. 6, 2006

(65) Prior Publication Data
US 2007/0236629 A1    Oct. 11, 2007

(30) Foreign Application Priority Data
Jan. 20, 2006    (TW) ............................. 95102160 A

(51) Int. Cl.
*G02F 1/1335*    (2006.01)
(52) U.S. Cl. ..................... 349/114; 349/144; 349/145; 349/146
(58) Field of Classification Search ............. None
See application file for complete search history.

(56) References Cited

U.S. PATENT DOCUMENTS

| | | | |
|---|---|---|---|
| 6,295,108 B1 * | 9/2001 | Kaneko | ................ 349/115 |
| 6,515,725 B1 | 2/2003 | Hattori et al. | |
| 6,597,424 B2 * | 7/2003 | Hattori et al. | ................ 349/146 |
| 6,714,276 B2 | 3/2004 | Towler et al. | |
| 6,801,281 B2 | 10/2004 | Huang et al. | |
| 6,806,969 B2 | 10/2004 | Clifford, Jr. et al. | |
| 6,816,217 B2 | 11/2004 | Sone et al. | |
| 6,822,709 B1 | 11/2004 | Chuang et al. | |
| 6,862,065 B2 | 3/2005 | Liao et al. | |
| 7,084,942 B2 * | 8/2006 | Luo | ................ 349/114 |
| 2001/0017680 A1 * | 8/2001 | Kim | ................ 349/115 |
| 2001/0055082 A1 * | 12/2001 | Kubo et al. | ................ 349/114 |
| 2003/0020857 A1 | 1/2003 | Konno et al. | |
| 2005/0030450 A1 * | 2/2005 | Okamoto et al. | ................ 349/113 |
| 2005/0052399 A1 | 3/2005 | Hattori et al. | |

FOREIGN PATENT DOCUMENTS

EP    0 996 028 A2    4/2000

* cited by examiner

*Primary Examiner*—Uyen-Chau N Le
*Assistant Examiner*—Chad H Smith
(74) *Attorney, Agent, or Firm*—Muncy, Geissler, Olds & Lowe, PLLC

(57) ABSTRACT

A transflective liquid crystal display device includes a first and a second substrates, a liquid crystal layer, and a plurality of reflective electrodes and transparent electrodes. The liquid crystal layer is interposed between the first and the second substrates and functions in an OCB mode. The reflective electrode and the transparent electrode in one picture element are spaced apart from each other to produce a transverse electric field when a voltage is applied across the liquid crystal layer.

12 Claims, 12 Drawing Sheets

TRANSFLECTIVE LIQUID CRYSTAL DISPLAY DEVICE

BACKGROUND OF THE INVENTION (a) Field of the Invention

The invention relates to a transflective liquid crystal display device and, more particularly, to a transflective liquid crystal display device using an OCB (optically compensated birefringence) technique which realizes a wide view-field angle and high-speed response.

(b) Description of the Related Art

Twisted nematic (TN) cells, which at present are widely used in thin film transistor (TFT) liquid crystal display devices, have a small view-field angle and low-speed respond. To solve this problem, studies on an OCB (optically compensated birefringence) technique have been made. Specifically, in case of displaying moving images, a response time is required in the order of ten milliseconds or even less, and the OCB technique is possible to obtain a high-speed response characteristic as well as a wide view-field angle. Hence, it is the best mode suitable for accommodating a recent trend of multimedia and motion picture processing that allows a vast amount of image data to be moved on the screen of a display device at high speed.

FIGS. 1A-1C show schematic diagrams illustrating the transformation of splay-bend alignment of liquid crystal molecules in an OCB cell 102.

Referring to FIG. 1A, the liquid crystal layer exhibits an initial splay-aligned state when no voltage is applied across it, where the liquid crystal molecules in the region A and region B tilt at a very small angle (compared with the later described angles shown in FIG. 1B and FIG. 1C) to the alignment films 104 and 106. Also, the liquid crystal molecules in the region C turn to nearly parallel to the alignment films 104 and 106.

Next, as shown in FIG. 1B, when a voltage is applied to the liquid crystal layer exhibiting splay alignment and gradually increased to approach a threshold voltage Vt, the splay alignment of liquid crystal molecules is deformed and transformed to a bend alignment, where the angle between the liquid crystal molecules and the alignment film 104 in the region A and the angle between the liquid crystal molecules and the alignment film 106 in the region B are both increased. Further, the liquid crystal molecules in the region C are almost perpendicular to the alignment films 104 and 106. At this time, the OCB cell is in a white state and has maximum brightness.

Then, when the voltage is continually increased to exceed a critical voltage Vc, the angle between the liquid crystal molecules and the alignment film 104 in the region A, and the angle between the liquid crystal molecules and the alignment film 106 in the region B are both increased to a maximum, about 80 degrees or more. Further, most of the liquid crystal molecules in the region C are perpendicular to the alignment films 104 and 106. At this time, the aligned direction of the liquid crystal molecules is almost perpendicular to the absorption axis of a polarizer (not shown), so the OCB cell is in a dark state. Thus, the OCB mode works when the applied voltage has a value between the threshold voltage Vt and the critical voltage Vc.

In the OCB cell, the liquid crystal molecules are well arranged to allow for a reduced friction during rotation, so that a wide view-field angle and high-speed response are realized. However, in order to operate an OCB mode LCD device, the applied voltage should be higher than the threshold voltage Vt. Thus, it may take much time to increase the applied voltage from zero to reach a threshold value once the threshold voltage Vt is high. More specifically, the threshold voltage Vt should be as low as possible to decrease the response time of the OCB mode LCD device and to prevent its thin film transistors from being damaged.

On the other hand, the OCB technique is typically used in either a transmission type or a reflection type LCD device. Though the transmission type LCD device uses backlight to obtain a bright display independent of surrounding environments, the panel brightness is often not sufficient when the device is exposed to direct sunlight. In comparison, a reflection type LCD device employs surrounding light to effect a display so that a backlight source is omitted; however, the reflection type LCD device is largely deteriorated in visibility in a dark surrounding. Hence, there has been a strong demand for designing an OCB mode LCD device that operates at a low threshold voltage and possesses good visibility in any environment.

BRIEF SUMMARY OF THE INVENTION

Hence, an object of the invention is to provide an optically compensated birefringence (OCB) mode transflective liquid crystal display device that operates at a low threshold voltage to realize a wide view-field angle and high-speed response and possesses good visibility in any environment.

According the invention, a transflective liquid crystal display device includes a first and a second substrates, a liquid crystal layer, and a plurality of reflective electrodes and transparent electrodes. The liquid crystal layer is interposed between the first and the second substrates and functions in an OCB mode. Each reflective electrode is formed on the reflective region, and each transparent electrode is formed on the transmissive region of each picture element of the transflective LCD device. The reflective electrode and the transparent electrode in one picture element are spaced apart from each other to produce a transverse electric field between them when a voltage is applied across the liquid crystal layer.

Through the design of the invention, since the reflective electrode and the transparent electrode are spaced apart from each other, a traverse electric field applied in different horizontal directions is produced when a voltage difference exists between the two separate electrodes. Hence, in case of having splay alignment of liquid crystal molecules under the initial state of an OCB mode, the liquid crystal molecules will tilt toward different directions following the different horizontal directions of the traverse electric field to result in azimuthal disorder of tilt angle directions. Under the circumstance, it is easy to create a great number of transition nucleuses that contribute to transform the splay alignment into the bend alignment due to the azimuthal disorder of tilt angle directions. Thereby, the OCB cell is quickly transformed into a bend-aligned state to effect a display device, and possible domain defects (non-transferred splay-aligned regions) are minimized as a result.

DETAILED DESCRIPTION OF THE INVENTION

Figure 1A:
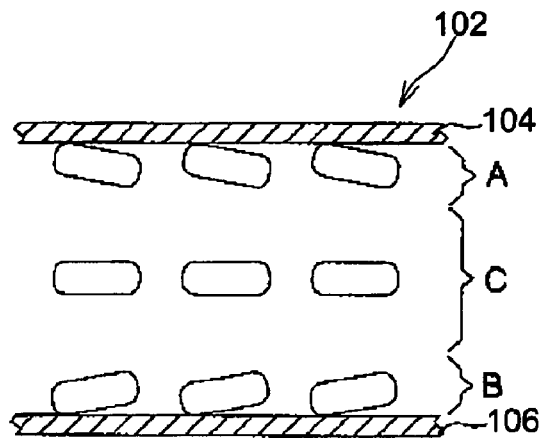
FIGS. 1A-1C show schematic diagrams illustrating the transformation of splay-bend alignment of liquid crystal molecules in an OCB cell.
Figure 1B:
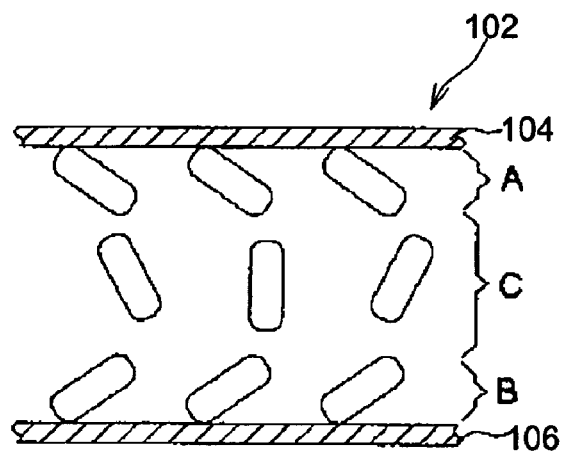
Figure 1C:
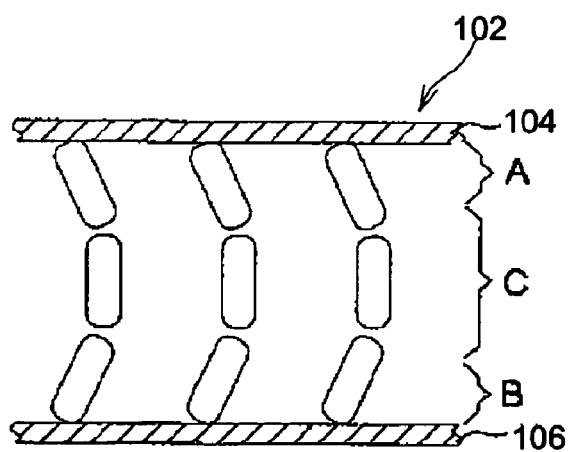
Figure 2:
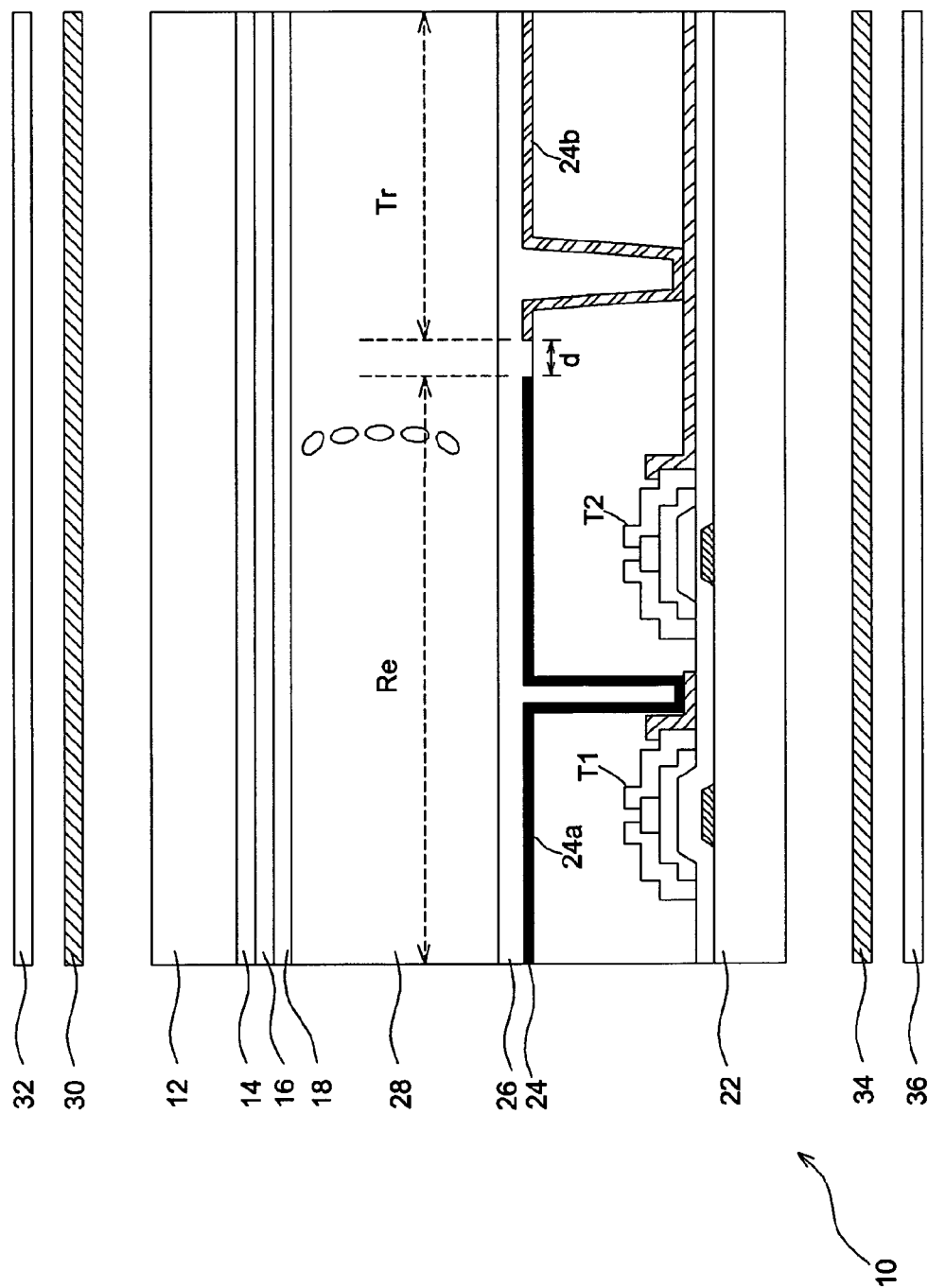
FIG. 2 shows a sectional schematic view illustrating a transflective LCD device according to an embodiment of the invention.

FIG. 2 shows a sectional schematic view illustrating a transflective liquid crystal display (LCD) device 10 according to an embodiment of the invention. Though the transflective LCD device 10 includes a plurality of picture elements, FIG. 2 simply illustrates one of them since all the picture elements have identical structures.

Referring to FIG. 2, a first substrate 12 and a second substrate 22 are placed to face with each other, and a liquid crystal layer 28 functioning in an optically compensated birefringence (OCB) mode is interposed between them. On the first substrate 12 a color filter 14, a common electrode 16, and a first alignment film 18 are sequentially formed. The common electrode 16 is formed from indium tin oxide (ITO) or indium zinc oxide (IZO) transparent conductive films. On the second substrate 22 a pixel electrode 24 and a second alignment film 26 are formed. Further, a first biaxial film 30 and a first polarizer 32 are positioned in one side of the first substrate 12 opposite to the liquid crystal layer 28, and a second biaxial film 34 and a second polarizer 36 are positioned in one side of the second substrate 22 opposite to the liquid crystal layer 28.

According to the invention, each pixel electrode 24 provided in a picture element, such as provided corresponding to a red, green, or blue sub-pixel, is divided into two separate parts. As shown in FIG. 2, the isolated first and second parts of the pixel electrode 24 are spaced apart from each other by an interval d. In this embodiment, the first part of the pixel electrode 24 is a reflective electrode 24a made from film materials having high conductivity and reflectivity, such as aluminum, silver, or metal alloy, and the second part is a transparent electrode 24b made from transparent conductive films, such as indium tin oxide (ITO) or indium zinc oxide (IZO) films. Hence, each picture element of the transflective LCD device 10 is provided with a reflective region Re and a transmissive region Tr to make excellent use of both environmental light and backlight.

Figure 3A:
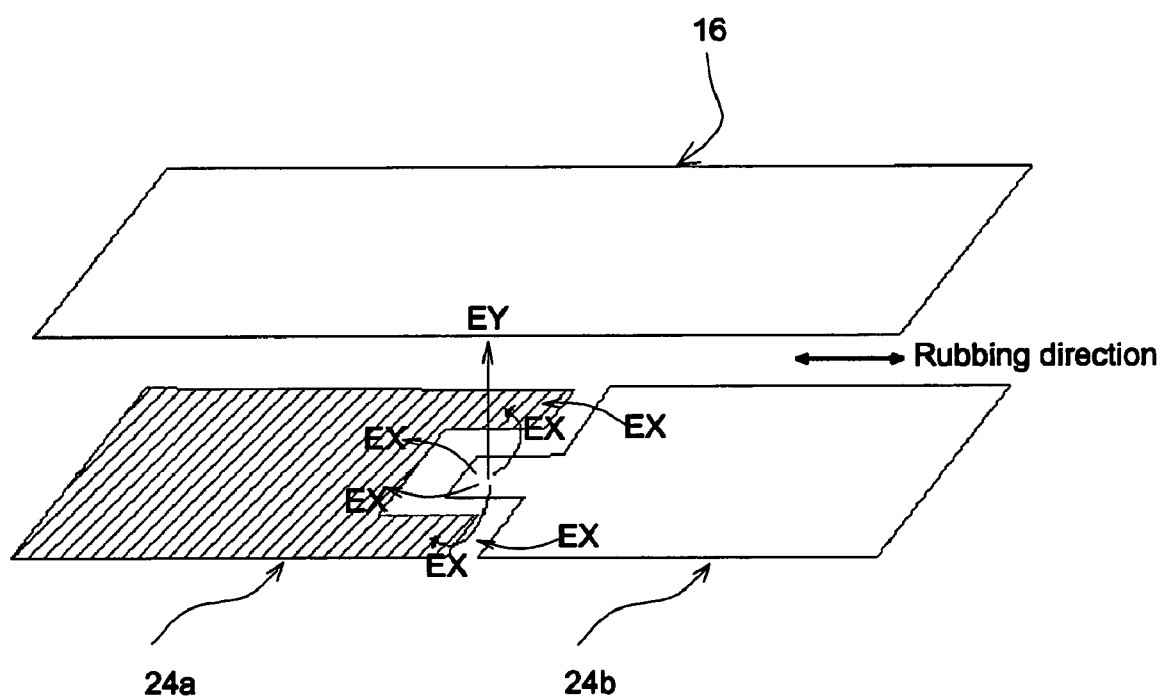
FIG. 3A shows a schematic diagram illustrating relative distributions of a reflective electrode and a transparent electrode according to an embodiment of the invention.

FIG. 3A shows a schematic diagram illustrating relative distributions of a reflective electrode and a transparent electrode according to an embodiment of the invention, on which the rubbing direction of polyimide (PI) of a liquid crystal cell (LC cell) is denoted as a reference direction. Referring to FIG. 3A, each pixel electrode 24 is divided into two separate parts, the reflective electrode 24a and the transparent electrode 24b, which are preferably formed in substantially the same plane. In this embodiment, the reflective electrode 24a has a concave portion, and the transparent electrode 24b has a convex portion complementary to the concave portion of the reflective electrode 24a. Hence, when a voltage difference exists between the two separate electrodes 24a and 24b, a traverse electric field EX applied in different horizontal directions (all parallel to the rubbing direction) is produced between the concave and convex structures. Hence, in case of having splay alignment of molecules under the initial state of an OCB mode, when a voltage is applied between the common electrode 16 and the pixel electrode 24, the liquid crystal molecules will tilt toward different horizontal directions following the different directions of the traverse electric field EX to result in azimuthal disorder of tilt angle directions. Under the circumstance, it is easy to create a great number of transition nucleuses that contribute to transform the splay alignment into the bend alignment due to the azimuthal disorder of tilt angle directions. This enables swift and reliable transformation from the splay alignment to the bend alignment.

Figure 4:
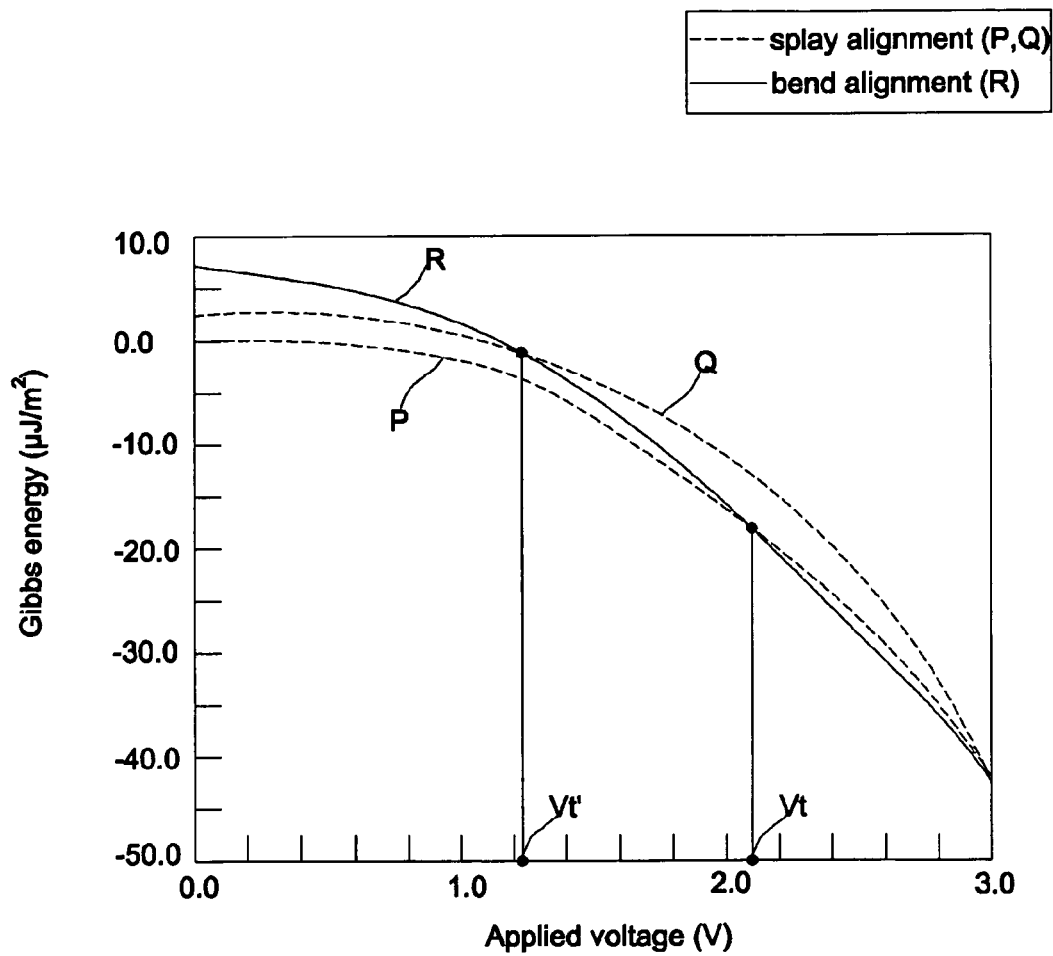
FIG. 4 shows a curve diagram illustrating examples of the calculation of Gibbs energy in relation to splay alignment and bend alignment.

FIG. 4 shows a curve diagram illustrating examples of the calculation of Gibbs energy, where a solid line indicates the calculation result in relation to the bend alignment, and dash lines indicates the calculation results in relation to the splay alignment. Referring to FIG. 4, in order to operate an OCB cell, the applied voltage should be higher than the threshold voltage Vt at which value the calculation of Gibbs energy under the bend alignment should equal to that under the splay alignment. According to the invention, since a transverse electric field is additionally provided as a result of the division of a pixel electrode to cause azimuthal disorder of tilt angle directions, the calculation of Gibbs energy under splay alignment is raised and its depiction is shifted from curve P to curve Q, meaning the former threshold voltage Vt is decreased to a lower one Vt'. Thereby, the OCB cell is quickly transformed into a bend-aligned state to effect a display device, and possible domain defects (non-transferred splay-aligned regions) are minimized as a result.

Figure 3B:
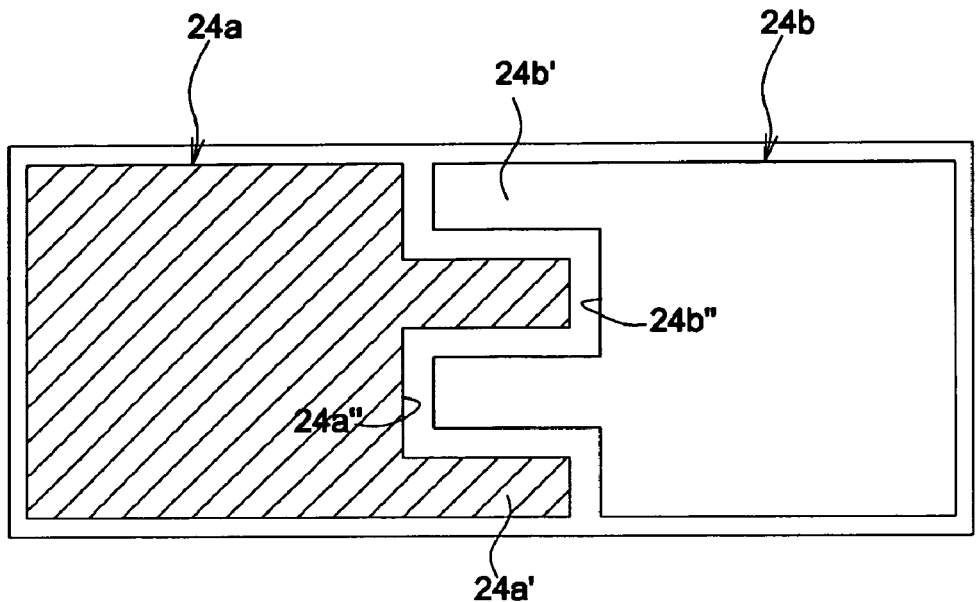
FIG. 3B shows a schematic diagram illustrating relative distributions of a reflective electrode and a transparent electrode according to another embodiment of the invention.
Figure 3C:
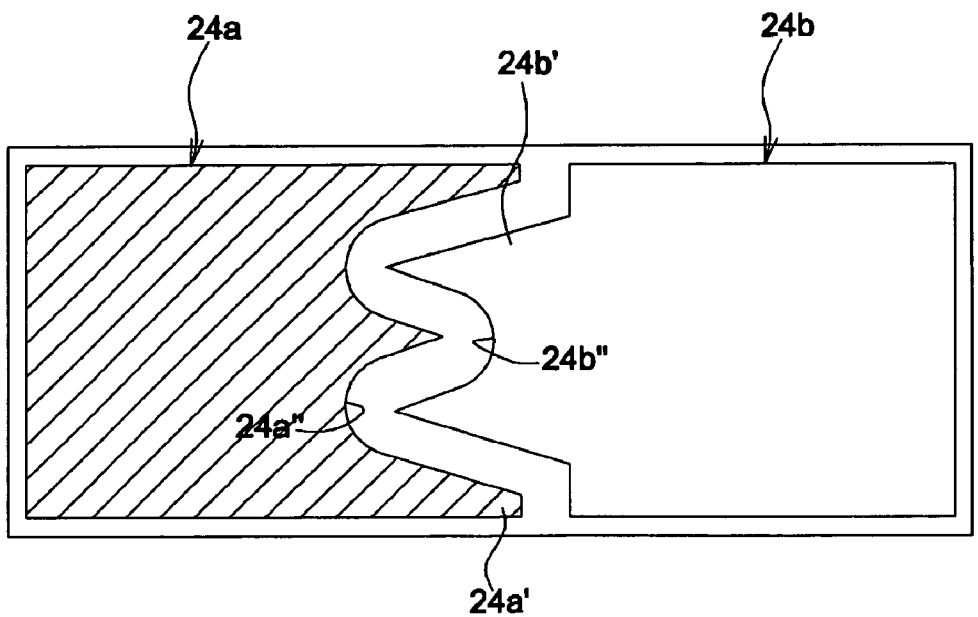
FIG. 3C shows a schematic diagram illustrating relative distributions of a reflective electrode and a transparent electrode according to another embodiment of the invention.

Further, the division of a pixel electrode is not limited to a specific manner, as long as a transverse electric field is produced to result in azimuthal disorder of tilt angle directions. As shown in FIG. 3B, in an alternate embodiment the reflective electrode 24a is provided with multiple convex portions 24a' and concave portions 24a", and the transparent electrode 24b is also provided with multiple convex portions 24b' and concave portions 24b" complementary to opposite concave or convex portions of the reflective electrode 24a. Also, the configuration of these structures are not limited to a rectangular shape shown in FIG. 3B, but rather other shapes shown in FIG. 3C may also be used, such as an arc shape (concave portion 24a"), a trapezoid shape (convex portion 24a'), a triangular shape (convex portion 24b'), or a shape combined from at least two of them.

Moreover, the respective areas of the reflective electrode 24a and the transparent electrode 24b can be arbitrary selected according to any design factor such as environmental brightness.

Referring back to FIG. 2 again, the separate reflective electrode 24a and transparent electrode 24b are electrically connected to a first and a second thin film transistors T1 and T2, respectively, to individually control the electric fields on the reflective region and the transmissive region.

Figure 5A:
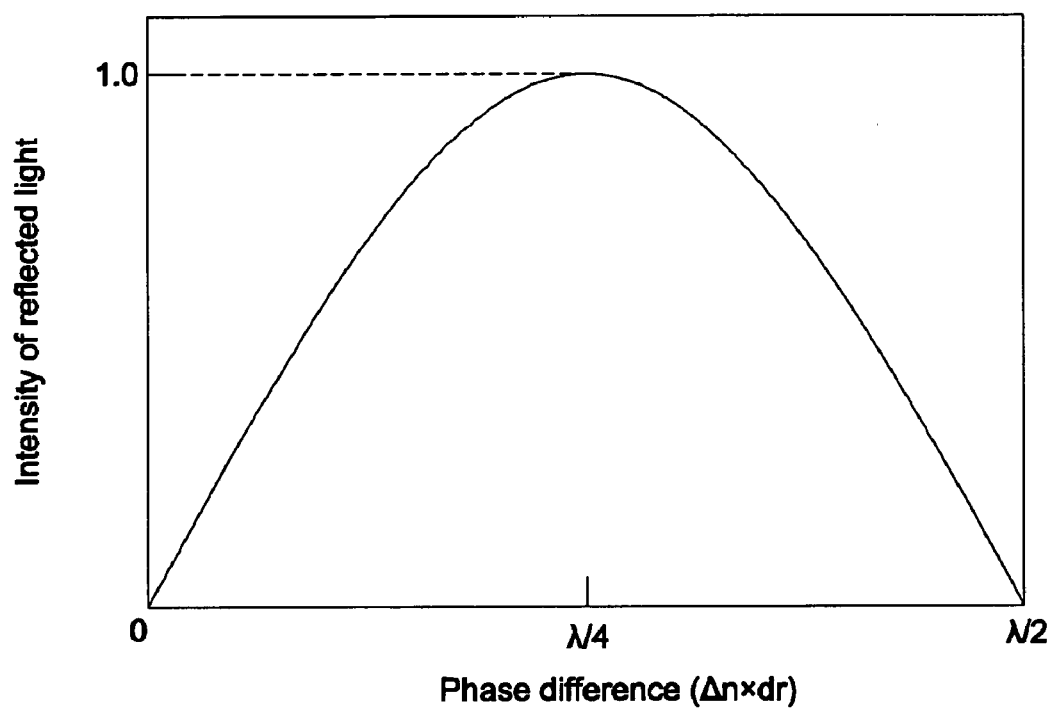
FIG. 5A shows a curve diagram illustrating relationship between the phase difference .n×dr and the intensity of reflected light in the reflective region of a transflective LCD.
Figure 5B:
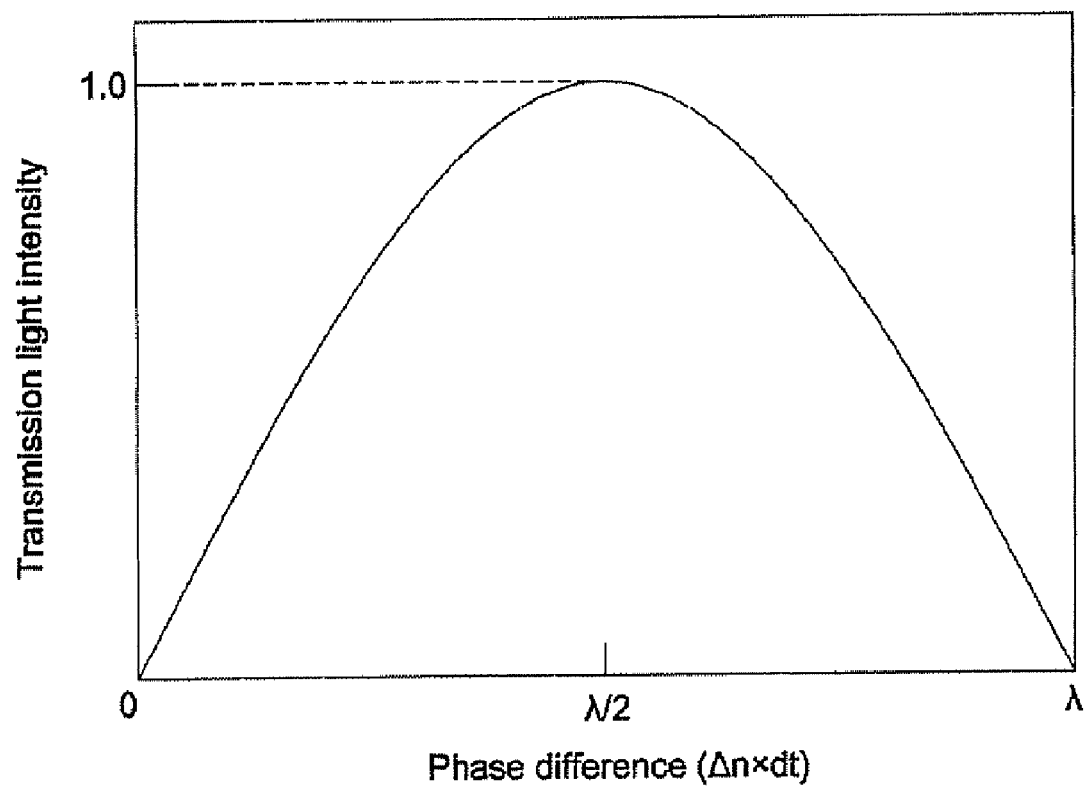
FIG. 5B shows a curve diagram illustrating relationship between the phase difference .n×dr and the intensity of transmission light in the transmissive region of a transflective LCD.

Unavoidably, light propagates through a transmissive region achieves a phase difference different to another phase difference achieved by the light propagating through a reflective region. For instance, when a twist angle is made to be 0 degrees, and further when . represents a wavelength of light, .n the birefringence of liquid crystal, dr the gap formed by the liquid crystal layer 28 in the reflective region, and dt the gap formed by the liquid crystal layer 28 in the transmissive region, the intensity of reflected light in the reflective region becomes maximum when the product .n×dr (phase difference) equals ./4. Relationship between the product .n×dr and the intensity of reflected light is shown in FIG. 5A. In comparison, the intensity of transmission light in the transmissive region becomes maximum when the product .n×dr equals ./2. Relationship between the product .n×dr and the intensity of transmission light is shown in FIG. 5B. Hence, according to this embodiment, the reflective region and the transmissive region are respectively corrected by reflectance and transmittance gamma curves by means of the two transistors T1 and T2 to allow for a single cell-gap transflective LCD device.

Also, as shown in FIG. 2, in this embodiment, the two transistors T1 and T2 are both positioned underneath the reflective electrode 24a to improve the aperture ratio of a transflective LCD device.

Figure 6:
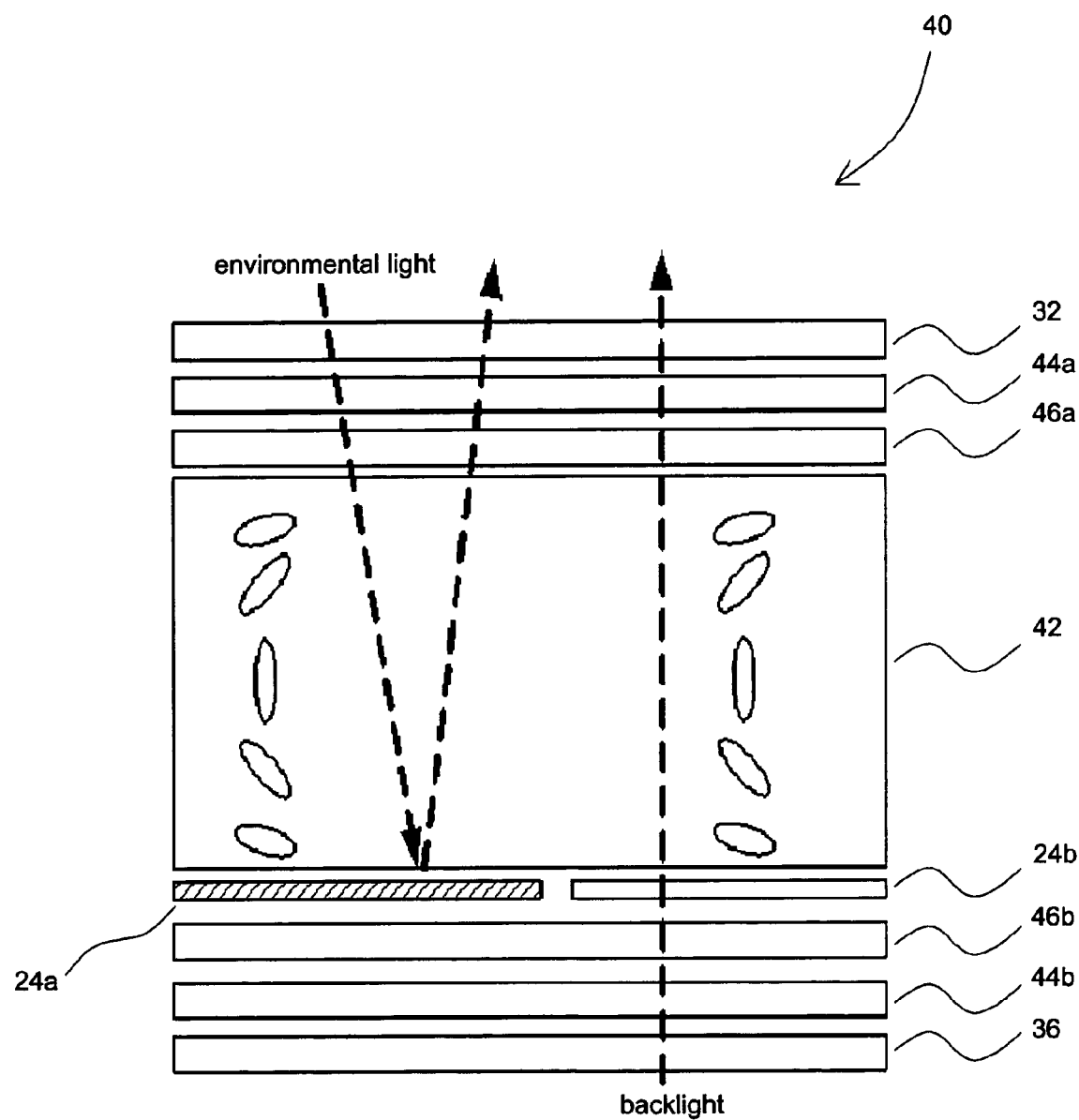
FIG. 6 shows a schematic diagram illustrating an OCB mode tansflective LCD having optical phase compensators.
Figure 7A:
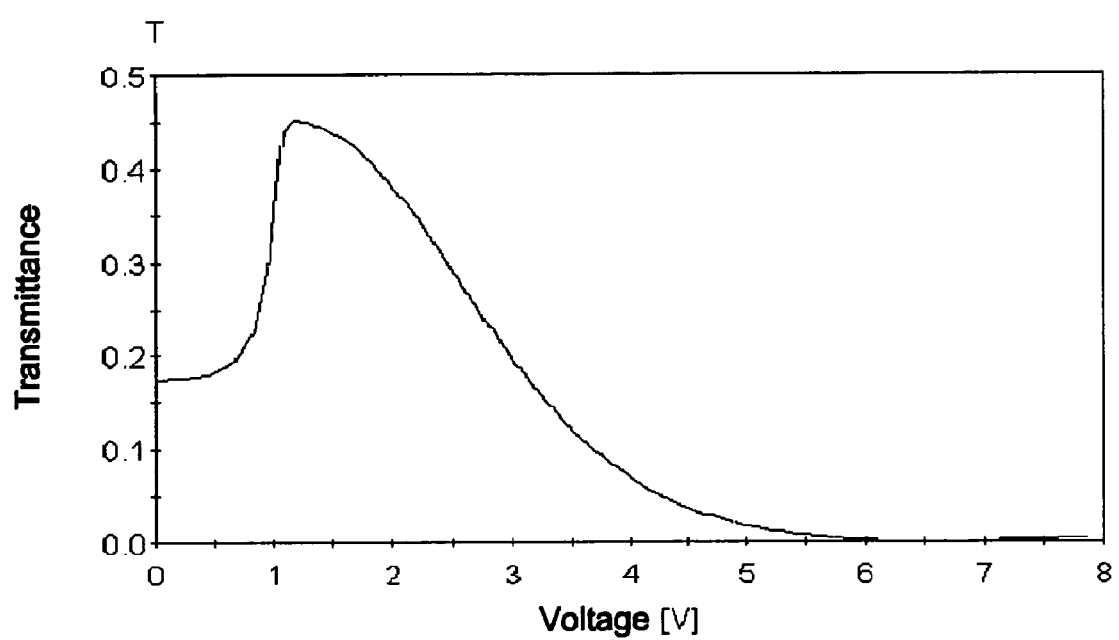
FIG. 7A shows a depiction of an output V-T curve according to the embodiment shown in FIG. 6.
Figure 7B:
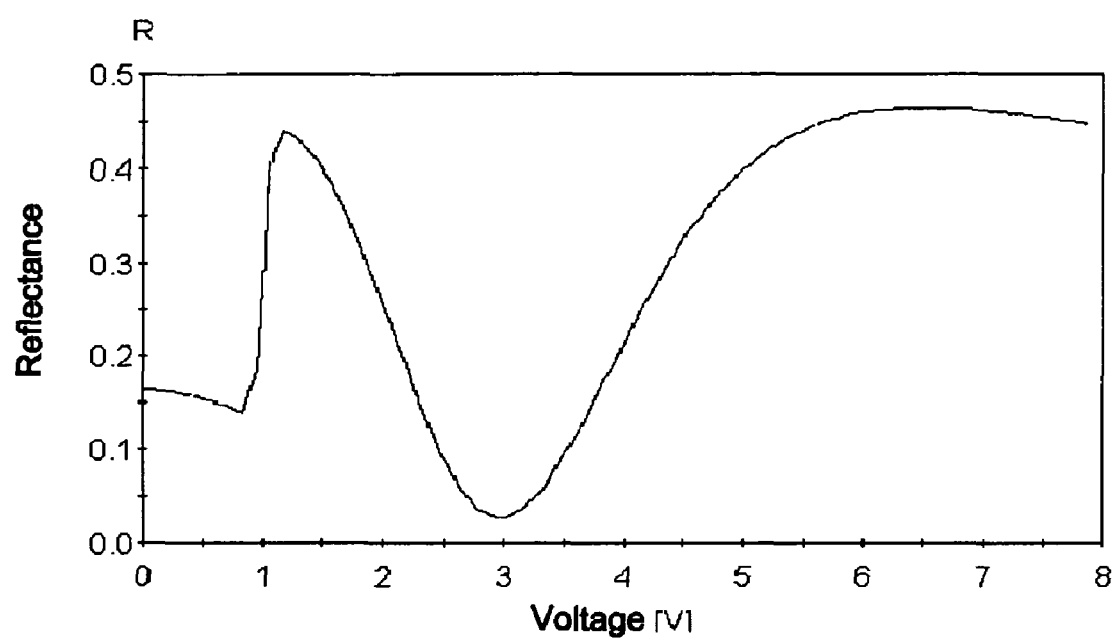
FIG. 7B shows a depiction of an output V-R curve according to the embodiment shown in FIG. 6.

FIG. 6 shows a schematic diagram illustrating an OCB mode tansflective LCD device 40 having optical phase compensators. Referring to FIG. 6, a first A-plate 44a and a first C-plate 46a are provided between top of an OCB cell 42 and a polarizer 32, and a second A-plate 44b and a second C-plate 46b are provided between the bottom of the OCB cell 42 and a polarizer 36. In this embodiment, the OCB cell 42 achieves a phase difference of 1000 nm, and the A-plate and the C-plate both introduce a phase difference of 1000 nm in X-Y plane and a phase difference of 200 nm in Z-direction. The contrast ratio obtained by this embodiment is up to 16, and the output V-T (voltage-transmittance) curve and V-R (voltage-reflectance) curve of this embodiment are respectively depicted in FIGS. 7A and 7B. From FIGS. 7A and 7B, it is seen the threshold voltage Vt, at which value the splay-aligned liquid crystal molecules are transformed into bend-aligned liquid crystal molecules, is considerably decreased.

Figure 8A:
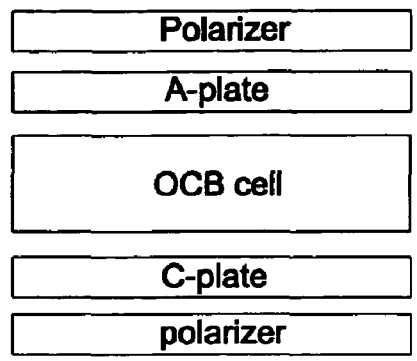
FIG. 8A-8C show schematic diagram illustrating another embodiments of the OCB mode tansflective LCD having optical phase compensators.
Figure 8B:
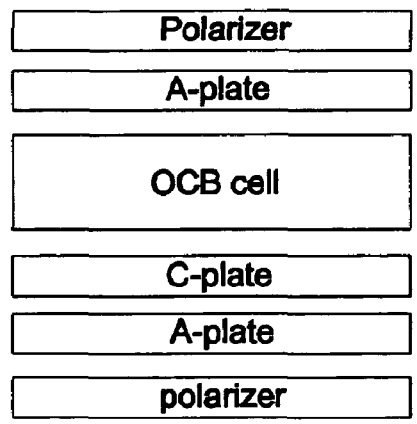

Further, the optical phase compensators used in an OCB mode tansflective LCD are not limited to biaxial compensation films shown in FIG. 2, or the two sets of A-plates and C-plates shown in FIG. 6. In an alternate embodiment, only one set of A-plate and C-plate is used, as shown in FIG. 8A. Alternatively, a single A-plate and a combination of A-plate and C-plate are respectively provided on two sides of the OCB cell 42, as shown in FIG. 8B.

Figure 8C:
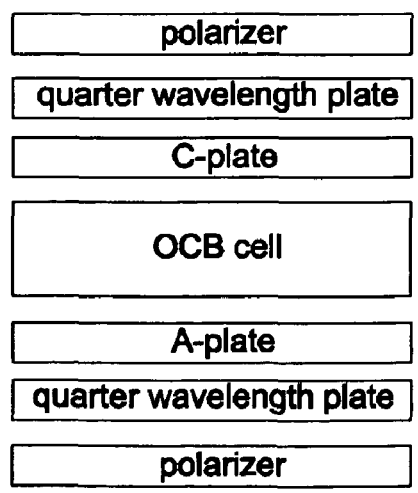

Moreover, as shown in FIG. 8C, a first and a second quarter wavelength plates are provided between the polarizers and the OCB cell 42, so that a linear polarized OCB cell is transformed into a circular polarized OCB cell to improve the light transmittance of an OCB mode transflective LCD device.

Figure 9:
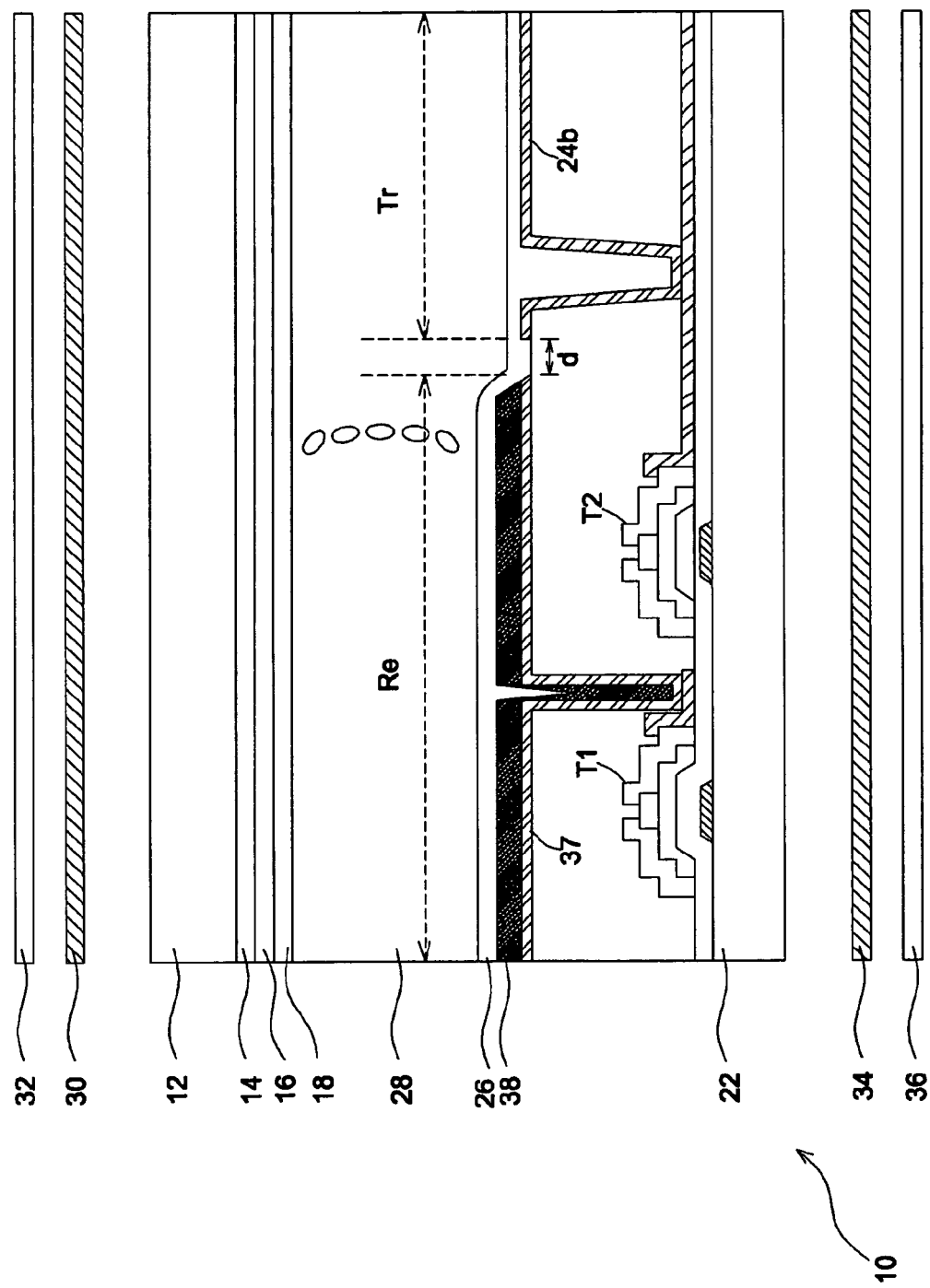
FIG. 9 shows a sectional schematic view illustrating another transflective LCD device according to another embodiment of the invention.

Besides, though the reflective electrode 24a shown in FIG. 2 is a single-layer structure made from a reflective film having high conductivity, the formation of the reflective electrode 24a is not limited to such manner. For instance, as shown in FIG. 9, the reflective electrode 24a may be formed as a double-layer structure consisting of a transparent conductive film 37 and a reflective film 38 overlaying the transparent conductive film 37.

While the invention has been described by way of examples and in terms of the preferred embodiments, it is to be understood that the invention is not limited to the disclosed embodiments. To the contrary, it is intended to cover various modifications and similar arrangements as would be apparent to those skilled in the art. Therefore, the scope of the appended claims should be accorded the broadest interpretation so as to encompass all such modifications and similar arrangements.

What is claimed is:

1. A transflective liquid crystal display device having a plurality of picture elements, with each picture element having both a reflective region and a transmissive region, the display device comprising:
    a first substrate provided with a common electrode;
    a second substrate positioned facing the first substrate;
    a liquid crystal layer interposed between the first and the second substrates and functioning in an optically compensated birefringence (OCB) mode;
    a plurality of reflective electrodes, each of which is formed on the reflective region;
    a plurality of transparent electrodes, each of which is formed on the transmissive region, wherein the transparent electrode and the reflective electrode in one picture element are formed at substantially the same plane and are complementary in shape; and
    a plurality of first thin film transistors and second thin film transistors formed on the second substrate, the first thin film transistors being electrically connected to the reflective electrodes, and the second thin film transistors being electrically connected to the transparent electrode;
    wherein each of the picture elements has at least one first thin film transistor and at least one second thin film transistor, the reflective electrode and the transparent electrode in one picture element are spaced apart from each other to produce a transverse electric field between them when a voltage is applied across the liquid crystal layer, and the reflective electrode has at least one convex portion and the transmissive electrode has at least one concave portion complementary to the convex portion.

2. The transflective liquid crystal display device as claimed in claim 1, wherein the first and second thin film transistors are positioned underneath the reflective electrode.

3. The transflective liquid crystal display device as claimed in claim 1, wherein the reflective electrode is a single-layer structure made from a reflective film.

4. The transflective liquid crystal display device as claimed in claim 1, wherein the reflective electrode is a double-layer structure made from a transparent conductive film and a reflective film overlaying the transparent conductive film.

5. The transflective liquid crystal display device as claimed in claim 1, further comprising:
    a first polarizer positioned on one side of the first substrate opposite to the liquid crystal layer;
    a second polarizer positioned on one side of the second substrate opposite to the liquid crystal layer;
    a first optical phase compensator provided between the first polarizer and the first substrate; and
    a second optical phase compensator provided between the second polarizer and the second substrate.

6. The transflective liquid crystal display device as claimed in claim 5, further comprising:
    a first quarter wavelength plate provided between the first polarizer and the first substrate, and
    a second quarter wavelength plate provided between the second polarizer and the second substrate.

7. A transflective liquid crystal display device having a plurality of picture elements, with each picture element having both a reflective region and a transmissive region, the display device comprising:
    a first substrate provided with a common electrode;
    a second substrate positioned facing the first substrate;

a liquid crystal layer interposed between the first and the second substrates and functioning in an optically compensated birefringence (OCB) mode;

a plurality of reflective electrodes, each of which is formed on the reflective region;

a plurality of transparent electrodes, each of which is formed on the transmissive region, wherein the transparent electrode and the reflective electrode in one picture element are formed at substantially the same plane and are complementary in shape; and a plurality of first thin film transistors and second thin film transistors formed on the second substrate, the first thin film transistors being electrically connected to the reflective electrodes, and the second thin film transistors being electrically connected to the transparent electrode;

wherein each of the picture elements has at least one first thin film transistor and at least one second thin film transistor, the reflective electrode and the transparent electrode in one picture element are spaced apart from each other to produce a transverse electric field between them when a voltage is applied across the liquid crystal layer, and the reflective electrode has at least one concave portion and the transmissive electrode has at least one convex portion complementary to the concave portion.

8. The transflective liquid crystal display device as claimed in claim 7, wherein the first and second thin film transistors are positioned underneath the reflective electrode.

9. The transflective liquid crystal display device as claimed in claim 7, wherein the reflective electrode is a single-layer structure made from a reflective film.

10. The transflective liquid crystal display device as claimed in claim 7, wherein the reflective electrode is a double-layer structure made from a transparent conductive film and a reflective film overlaying the transparent conductive film.

11. The transflective liquid crystal display device as claimed in claim 7, further comprising:

a first polarizer positioned on one side of the first substrate opposite to the liquid crystal layer;

a second polarizer positioned on one side of the second substrate opposite to the liquid crystal layer;

a first optical phase compensator provided between the first polarizer and the first substrate; and a second optical phase compensator provided between the second polarizer and the second substrate.

12. The transflective liquid crystal display device as claimed in claim 11, further comprising:

a first quarter wavelength plate provided between the first polarizer and the first substrate, and a second quarter wavelength plate provided between the second polarizer and the second substrate.

* * * * *